UNITED STATES PATENT OFFICE.

HUGH STOTT TAYLOR, OF PRINCETON, NEW JERSEY, AND ERIC KEIGHTLEY RIDEAL, OF URBANA, ILLINOIS.

PROCESS OF GENERATING HYDROGEN.

1,411,760.     Specification of Letters Patent.     Patented Apr. 4, 1922.

No Drawing.     Application filed October 20, 1919. Serial No. 331,929.

*To all whom it may concern:*

Be it known that we, (1) HUGH STOTT TAYLOR and (2) ERIC KEIGHTLEY RIDEAL, both subjects of the King of Great Britain, residing at (1) Princeton, (2) Urbana, in the counties of (1) Mercer, (2) Champaign, and States of (1) New Jersey, (2) Illinois, have invented certain new and useful Improvements in Processes of Generating Hydrogen, of which the following is a specification.

This invention relates to the purification of hydrogen from carbon monoxid, and to the preparation of hydrogen under conditions to minimize the carbon monoxid content of the gas.

It is well known that in the practice of the various processes for generating hydrogen depending upon the alternate oxidation of iron by steam and the reduction of the resulting iron oxid by means of reducing gases, in addition to the hydrogen-generating reaction $$3Fe + 4H_2O = Fe_3O_4 + 4H_2$$

reactions likewise take place between steam and carbon deposited in the contact material or combined with the same, these side reactions yielding carbon monoxid and carbon dioxid. The formation of these latter gases, which always contaminate hydrogen produced as above, may take place in accordance with any of the following equations:

$$C + H_2O = CO + H_2;$$
$$C + 2H_2O = CO_2 + 2H_2;$$
$$CO + H_2O = CO_2 + H_2.$$

Also, carbon monoxid occurs as an impurity in hydrogen from sources other than that above mentioned, and in particular it tends to accumulate in the residual or spent gases from catalytic processes, such for example as the hydrogenation of fats and oils; in such cases small percentages of carbon monoxid which may have existed as an impurity in the original gas are of course rapidly concentrated as the hydrogen is absorbed.

Our invention is applicable to the removal of carbon monoxid from hydrogen derived from the above or other sources. The invention also contemplates such modification of the known processes for the generation of hydrogen by reaction of iron upon steam as will enable us to produce therefrom hydrogen which for practical purposes is free from carbon monoxid, or which contains the same in decidedly less proportion than is the case in the current practice of these processes.

Our researches have shown that in such hydrogen-generating processes as are mentioned above, during the steaming phase or so-called "make", there exists a definite relationship between the concentrations of the several gases present, that is to say steam, hydrogen, carbon monoxid and carbon dioxid, this relationship depending upon and varying with the state of oxidation of the iron and the working temperature of the retort. In general the ratio of steam to hydrogen rises progressively during the course of the make, owing to the fact that at the beginning of the make steam is decomposed almost quantitatively, whereas the decomposition falls progressively throughout the run and becomes very low at the end.

On the other hand, we have found that the ratio of carbon monoxid to carbon dioxid in the hydrogen as delivered decreases progressively throughout the steaming phase. This fact we attribute to the oxidation of $CO$ to $CO_2$ by the action of the increasing excess of steam mentioned above.

Based upon our above observations, we effect the purification of hydrogen derived from any source and containing excessive or undesirable concentrations of carbon monoxid, by passing the impure hydrogen through the retort system, along with the steam, during a suitable period of the steaming phase. Thereby the steam, which is inoperative in the hydrogen-generating reaction, is utilized to effect the transformation of $CO$ to $CO_2$, and therefore to effect a corresponding purification of the hydrogen admitted with the steam. Or to express the matter otherwise the non-reactive and therefore non-productive excess of steam which is unavoidably present in increasing proportions throughout the steaming phase is according to this process usefully employed to oxidize (with simultaneous generation of hydrogen) carbon monoxid introduced during such phase from an outside source.

Our invention is not limited to the maintenance of any definite ratio of steam to spent or impure hydrogen, since this ratio will necessarily vary with the operating conditions, nor is the invention limited to the introduction of the spent or impure hydrogen during any specific phase of the steaming period, because although the purification takes place most effectively during the later stages of the steaming process, when the steam is present in the largest excess, nevertheless the joint passage of spent or impure hydrogen and steam may occur throughout the entire steaming phase, with advantageous results so far as concerns the reduction of the carbon monoxid content of the hydrogen. The particular manner of operating the process will depend upon the concentration of carbon monoxid permissible for any specific use of the hydrogen.

An advantageous embodiment of the process consists in collecting the hydrogen produced during the initial steaming period, and containing as explained above relatively high concentrations of carbon monoxid, and returning the same through the retort system during the later steaming period, when the low hydrogen production leads to the presence of steam in relatively large excess. By operating in this way we are enabled to produce in a very simple manner and in the regular operation of the known processes, hydrogen in which the carbon monoxid content is decidedly lower than that of the average gas derived from the operation as now practiced. The yield of hydrogen in moreover increased, since it is not necessary to reject so much of the first portions of the hydrogen as is now commonly done, or to utilize such portions in connection with the reducing stage of the process.

The carbon dioxid resulting from the oxidation of the carbon monoxid may of course be readily eliminated from the hydrogen, if desired, in accordance with any of the well known methods.

We claim:—

1. In a process of generating hydrogen by alternately reacting with iron upon steam and reducing the resulting iron oxid, the step which consists in introducing with the steam, during a part at least of the steaming period, hydrogen containing carbon monoxid, whereby carbon monoxid is oxidized simultaneously with the generation of hydrogen.

2. Process according to claim 1, in which hydrogen generated during an earlier phase of the steaming period and containing carbon monoxid is returned through the system during a later phase of the steaming period, whereby its carbon monoxid content is diminished.

3. In a process of generating hydrogen by reacting with iron upon steam, the step which consists in introducing with the steam during a later phase only of the steaming period, hydrogen containing carbon monoxid, whereby carbon monoxid is oxidized simultaneously with the generation of hydrogen.

In testimony whereof, we affix our signatures.

HUGH STOTT TAYLOR.
ERIC KEIGHTLEY RIDEAL.